United States Patent [19]

Horn

[11] Patent Number: 4,532,706

[45] Date of Patent: Aug. 6, 1985

[54] RETAINING RING ASSEMBLY MACHINE

[75] Inventor: Edward R. Horn, Germantown, Wis.

[73] Assignee: Aladdin Engineering, Brookfield, Wis.

[21] Appl. No.: 518,123

[22] Filed: Jul. 28, 1983

[51] Int. Cl.³ .......................... B23Q 7/10; B23P 11/02
[52] U.S. Cl. .......................................... 29/809; 29/453
[58] Field of Search ............... 29/809, 225, 33 K, 433, 29/450, 453, 464; 59/20

[56] References Cited

U.S. PATENT DOCUMENTS

| 3,846,900 | 11/1974 | Weglage | 29/413 |
| 4,089,097 | 5/1978 | Good et al. | 29/453 |
| 4,100,717 | 7/1978 | Kontinen | 29/453 |

*Primary Examiner*—Howard N. Goldberg
*Assistant Examiner*—Steven E. Nichols

[57] ABSTRACT

An automated apparatus for forcing snap rings onto pins or rods of the type adapted to receive a snap ring. Apparatus is provided for moving or transferring successive snap rings to a position wherein they are aligned with the ends of the pins. Apparatus is further provided for then forcing the snap rings over a mandrel and onto the ends of the pins.

18 Claims, 9 Drawing Figures

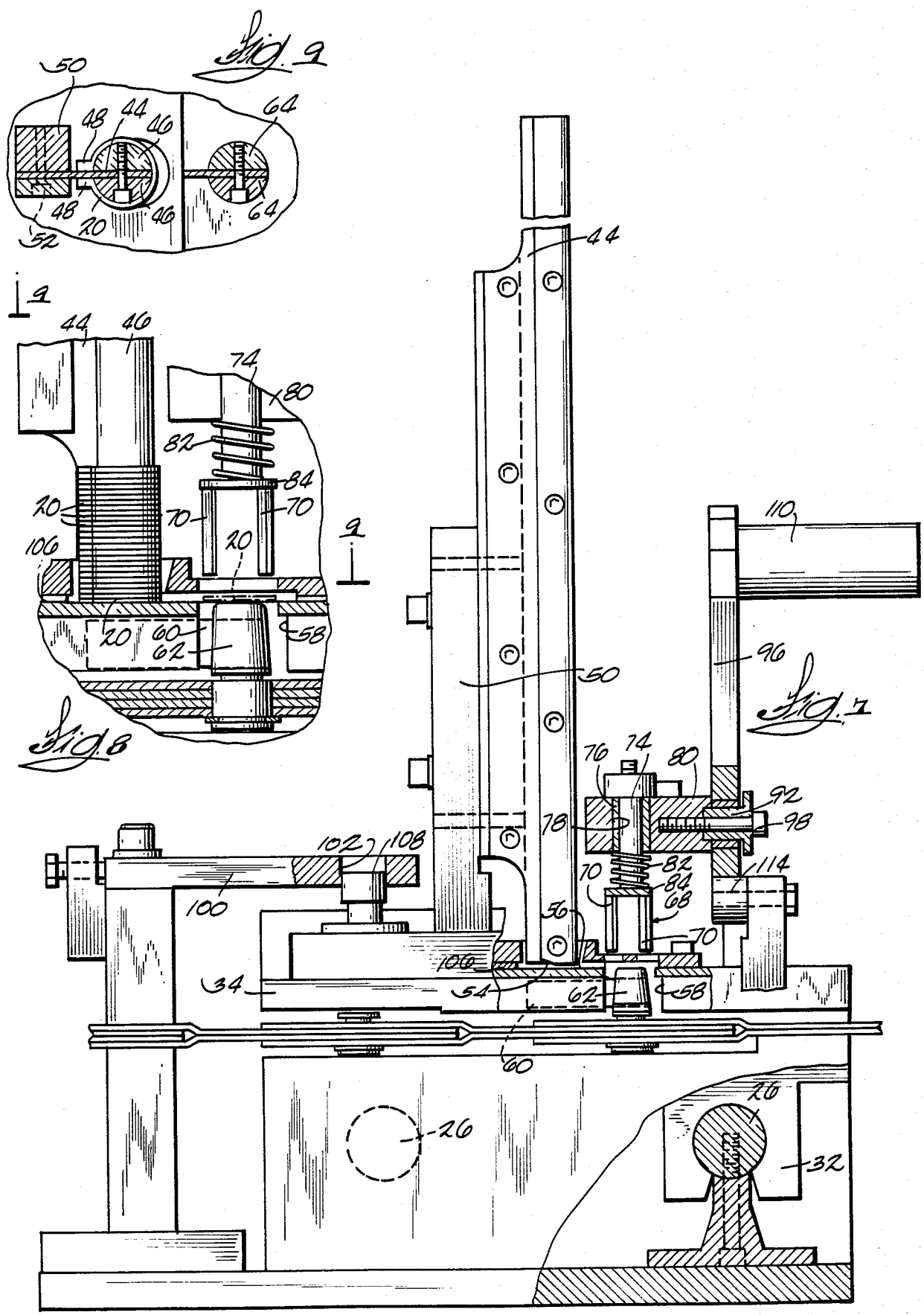

RETAINING RING ASSEMBLY MACHINE

FIELD OF THE INVENTION

The invention relates to apparatus for use in mounting snap rings on the ends of cylindrical pins such as the hinge pins of a chain.

BACKGROUND PRIOR ART

Snap rings of the type adapted to be placed on the ends of a rod or pin and adapted to be housed in a circumferencial groove in the end of the pin or rod are commonly applied using pliers of a type particularly designed for such an application. These pliers can grip the free ends of the legs of a snap ring and force them apart sufficiently that the inside generally circular bore of the snap ring is expanded sufficiently that the snap ring can be forced over the end of a cylindrical pin and positioned in a circumferencial groove of the pin. The pliers are then released to permit the snap ring to snap into the circumferencial groove.

In the construction of link chains, it is common that the chain links are joined by hinge pins, with each of the hinge pins held in place by a snap ring positioned on one end of the hinge pin. Due to the large number of hinge pins and snap rings employed in the construction of such a chain there has been a substantial need for an automated apparatus for placing the snap rings onto the ends of the hinge pins.

SUMMARY OF THE INVENTION

The present invention provides an automated apparatus for forcing snap rings onto the ends of hinge pins or similar pins or rods of the type adapted to receive a snap ring. The present invention provides a means for supporting a large number of snap rings while maintaining alignment of the snap rings with respect to one another and with respect to the pins adapted to receive the snap rings. The invention also includes means for supporting the hinge pins or the like such that one end of the hinge pin or hinge pins is particularly adapted to receive a snap ring.

Means are also provided for moving or transferring the plurality of snap rings from the magazine or other means for supporting the snap rings to a position wherein they are aligned with the ends of respective ones of the pins.

Means are further provided for then forcing one or more snap rings onto the ends of the pins.

One of the features of the invention is that the apparatus embodying the invention includes means for maintaining alignment of the snap rings, one with respect to another and means for maintaining positive alignment and positioning of the snap rings as they are moved in the machine from one station to the next and as they are forced onto the end of the pin or rod adapted to receive the snap ring.

Another of the features of the invention is the provision of a single lever for causing translation of the carriage of the machine and for also causing movement of the snap rings into position with the cylindrical pins or rods and further movement of these snap rings onto the cylindrical pins. In a preferred form of the invention, the lever is supported for movement forwardly to cause translation of the carriage from a rearward position to a forward position. Once the carriage reaches the forward position, the free end of the lever is moveable downwardly to thereby cause the snap rings to be forced onto the ends of the pins. Since a single lever is provided and since this lever is moveable through a generally continuous and linear path to effect a complete cycle of operation of the apparatus, the apparatus is conveniently adapted for operation by a fluid cylinder rather than by manual operation.

Another feature of the present invention is that the apparatus embodying the invention has an uncomplicated structure and can be manufactured at a minimum cost.

Another of the features of the invention is that the apparatus is constructed such that it can handle a variety of sizes of hinge pins and snap rings with a minimum of modification of the machine. The machine is also constructed such that such modification can be easily achieved with the replacement of a few interchangeable parts.

Another of the advantages of the apparatus of the invention is that it is capable of handling snap rings having an irregular shape or size. It is common that a quantity of snap rings will contain some snap rings with imperfections in that the rings will be bent such that the rings may be noncircular or nonplanar. The apparatus of the invention provides a means for maintaining control over the orientation of the snap ring throughout the handling of each individual snap ring and also provides a means for reforming the snap ring as the snap ring is forced over a mandrel onto the end of the pin or rod adapted to receive the snap ring. Due to the design of the apparatus embodying the invention, a distorted snap ring or noncircular snap ring will not jam the machine and can be reshaped so that it is functional.

Various other features and advantages of the invention will be apparent by reference to the following description of a preferred embodiment, from the drawings, and from the claims.

BRIEF DESCRIPTION OF THE DRAWINGS

FIG. 7 is a view taken along line 7—7 in FIG. 3 and with portions broken away.

FIG. 8 is an enlarged partial view of apparatus illustrated in FIG. 7.

FIG. 9 is a cross section view taken along line 9—9 in FIG. 8.

Figure 1:
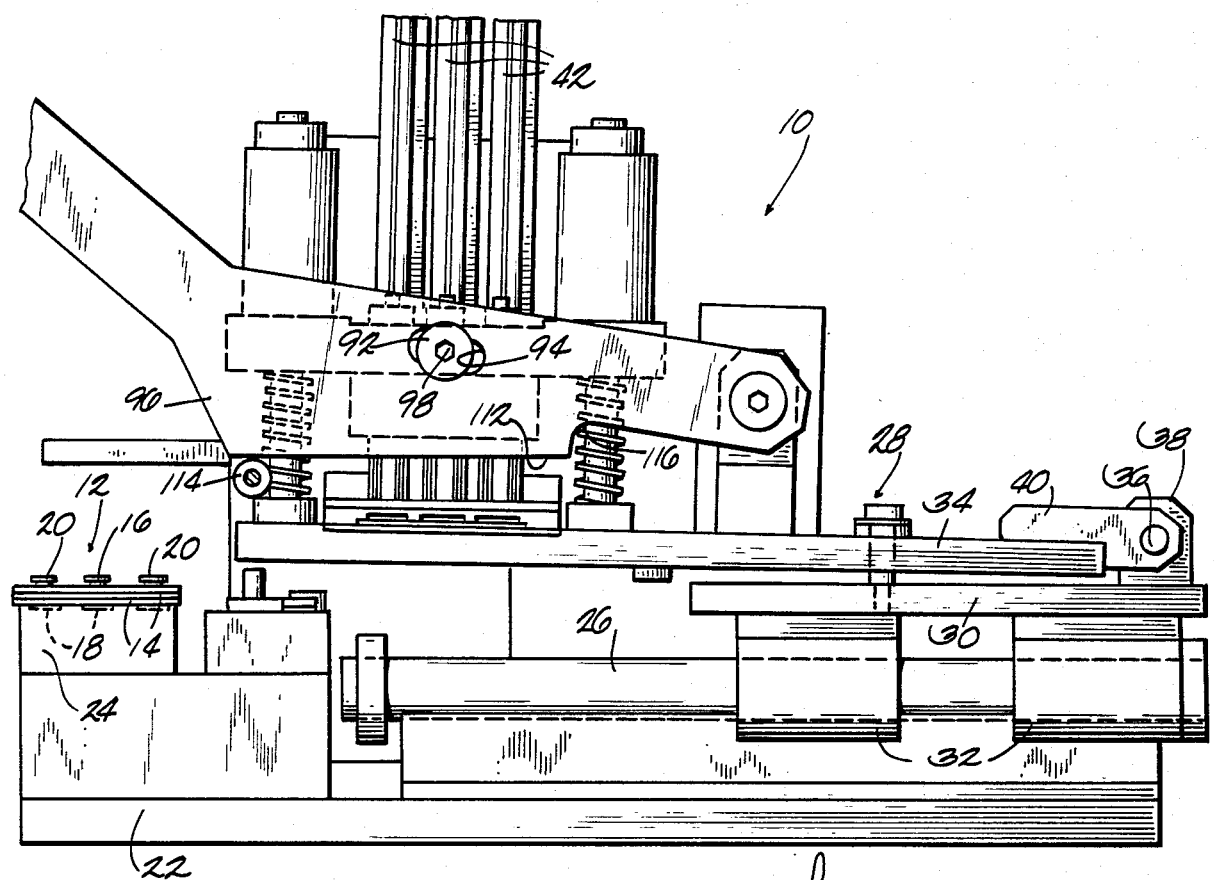
FIG. 1 is a side elevation view of a machine for applying snap rings and embodying the present invention.

Before describing the preferred embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 is a machine 10 embodying the invention and adapted to force a plurality of snap rings onto the end of pins of the type intended to support the snap rings. For purposes of example, and not by way of limitation, FIG. 1 illustrates the machine 10 embodying the invention as being used in connection with the manufacture of chains 12. In the chains shown in FIG. 1, each link of the chain being formed is comprised of three stacked metal plates 14 with three hinge pins 16 extending through the plates 14. One end of each pin includes a head 18, and each pin is intended to be held in place by a snap ring 20 forced onto the end of the pin and housed in a groove surrounding that end of the pin.

Referring more particularly to the construction of the machine 10, it includes a base 22 having an anvil 24 for supporting the links of the chain 12 being assembled and for supporting one or more pins 16 positioned such that the snap rings 20 can be forced downwardly onto the ends of those pins. The base 22 also supports a pair of horizontally spaced-apart guide rods 26.

The machine 10 also includes means for supporting a plurality of snap rings 20 and means for forcing individual snap rings 20 onto the ends of the pins 16 supported by the anvil 24. In the illustrated construction this means includes a carriage 28 supported on the guide rods 26 for movement toward and away from the anvil 24. The carriage 28 includes a generally horizontally disposed plate 30 spanning the pair of guide rods 26. The plate 30 is supported by four collars or sleeves 32 which surround the guide rods 26. The collars or sleeves 32 are supported on the guide rods 26 for slidable reciprocal movement along the length of the guide rods 26. The carriage also includes a second plate 34 positioned above the first plate 30 in generally stacked relation, and means are provided for pivotally joining a rearward edge of that plate to a rearward edge of the lower plate 30. While the means for pivotally joining the rearward edge of the upper plate 34 to the lower plate 30 could have various constructions, in the illustrated arrangement it includes hinge pins 36 each supported by brackets 38 extending upwardly from the rear portion of the plate 30. A pair of brackets 40 extend rearwardly from the upper plate 34 and include bores adapted to house hinge pins 36.

Means are also provided for supporting a plurality of snap rings 20 in vertically stacked relation. In the illustrated construction this means includes three elongated vertically extending columns 42, each column 42 being intended to support a long stack of snap rings 20 with the snap rings 20 aligned with respect to one another. Each column 42 is comprised of an elongated thin metal plate or blade 44 having a lower end fixed to the horizontal plate. As best shown in FIG. 9, a pair of semi-cylindrical members 46 are secured to opposite faces of one edge of the vertical blade 44. The two semi-cylindrical members 46 are positioned with respect to each other so as to form a generally elongated cylinder. The snap rings 20 are placed in stacks on the upper end of the elongated columns 42 and with the legs 48 of the snap ring positioned on opposite sides of the blade 44 as shown in FIG. 9.

Means are also provided for supporting the elongated vertical blade 44. In the illustrated construction this means includes a vertical bar 50 anchored at its lower end to the base. The vertical blade 44 is secured by bolts 52 to the upwardly extending vertical bar 50.

As best shown in FIG. 7, the vertical blade 44 is supported such that the lower edge 54 is spaced from the adjacent surface 56 immediately below the vertical blade 44.

As shown in FIGS. 7 and 8, the lower ends of the cylindrical columns 42 supporting the snap rings are supported in spaced relation from the upper surface 56 of the plate 34 such that the bottom snap ring 20 on the vertical column 42 can move laterally from the position immediately below the stack of snap rings 20 to a second position where the snap ring 20 is positioned above one of the hinge pins 16 intended to receive the snap ring.

Means are also provided for guiding the snap ring 20 onto the pins 16. In the illustrated construction the plate 34 is provided with a vertical bore 58 somewhat larger in diameter than the snap rings 20. A thin vertically-oriented blade or plate 60 is housed in a narrow slot in the plate 34 and projects into the circular bore 58. The vertical blade 60 functions as a means for supporting a mandrel 62 immediately above the hinge pin 16. The mandrel 62 comprises a pair of generally semi-cylindrical members 64 (FIG. 9) secured to opposite faces of the blade 60 and fixed to the blade 60 such that they form a generally cylindrical structure disposed concentrically in the bore 58.

In a preferred form of the invention the lower surface of the mandrel 62 can be positioned on the upper end of the pin 16. The mandrel 62 is also tapered so as to increase in diameter at its bottom, and the diameter of the lower portion of the mandrel 62 is substantially the same as that of the pin 16 receiving the snap ring.

Means are also provided for causing the snap ring 20 to be forced downwardly over the mandrel 62 and onto the upper end of the pin 16 adapted to receive the snap ring. In the illustrated construction this means includes a plurality of rams 68, one ram positioned over each of the mandrels 62. Each ram 68 includes a plurality of vertically oriented fingers 70, the fingers 70 having lower ends adapted to engage the snap ring 20 to force it downwardly over the mandrel 62 and onto the end of the pin 16. The fingers 70 are spaced apart with respect to one another such that they can surround the mandrel 62 as they force the snap ring down over the mandrel 62.

Means are also provided for supporting the rams 68 for vertical reciprocal movement. In the illustrated construction, each ram 68 includes a generally vertical support shaft 74 slidably housed in a sleeve 76 which is in turn located in a bore 78 in a generally horizontally-oriented plate 80. A coil spring or compression spring 82 is positioned between the lower surface of the plate 80 and a shoulder 84 of the ram 68. While the vertical support shaft 74 of the ram 68 is vertically slidably movable with respect to the plate 80, the compression spring 82 biases the ram 68 toward its downward position.

Means are also provided for causing vertical reciprocal movement of the generally horizontal plate 80 supporting the rams 68. The opposite ends of the plate 80 are supported on vertical guide rods 88 and are also supported by compression springs 90 which surround the vertical guide rods 88. As best shown in FIGS. 1 and 7, a collar 92 is housed in a slot 94 in the lever 96 and is supported therein for limited slidable movement.

A bolt 98 extends through the collar 92 to fix the collar 92 to the horizontal plate 34 supporting the rams 68.

Means are also provided for causing successive snap rings 20 to be moved laterally from the position beneath the stack of snap rings to the position over the mandrel 62. In the illustrated construction this means includes a cam plate 100 including an elongated slot 102 defining a cam surface. The cam plate 100 is positioned in generally horizontal relation and is supported by a vertical support member 104, in turn supported by the base 22. The means for causing the lateral movement of the snap rings 20 also includes a plate 106 slidably supported by the plate 34 and supported for horizontal reciprocal movement between a retracted position shown in FIGS. 7 and 8 and a position wherein a snap ring 20 is moved to a position in vertical alignment with the mandrel 62. A cam 108 is fixed to the reciprocal plate 106 and extends upwardly from the plate. The upper end of the cam 108 is housed in the cam slot 102 in the cam plate 100.

In operation of the machine 10 embodying the invention when the carriage 28 is in the retracted position, the operator will position the workpiece such as the hinge plates 14 and hinge pins 16 in the desired positions and with the hinge pins 16 positioned in vertical orientation. The machine operator will then pull the handle 110 forwardly, thereby causing forward traverse of the carriage 28. As the carriage 28 moves forwardly, the cam 108 will move along the cam slot 102 and the cam 108 will cause the plate 106 to move laterally, thereby pushing the selected snap rings 20 to a position wherein they are located immediately above the mandrel 62.

Figure 2:
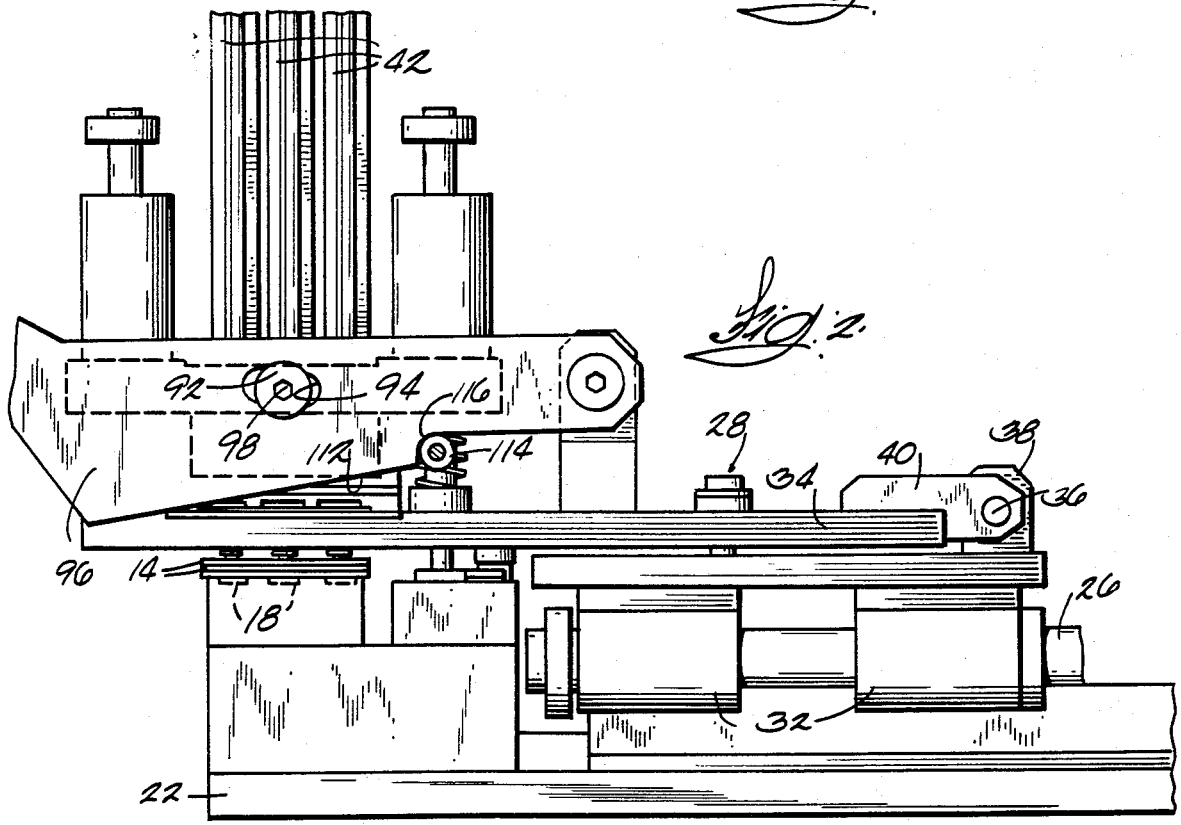
FIG. 2 is a partial side elevation view similar to FIG. 1 but showing a carriage portion of the machine moved from a rearward or retracted position to a forward position.
Figure 3:
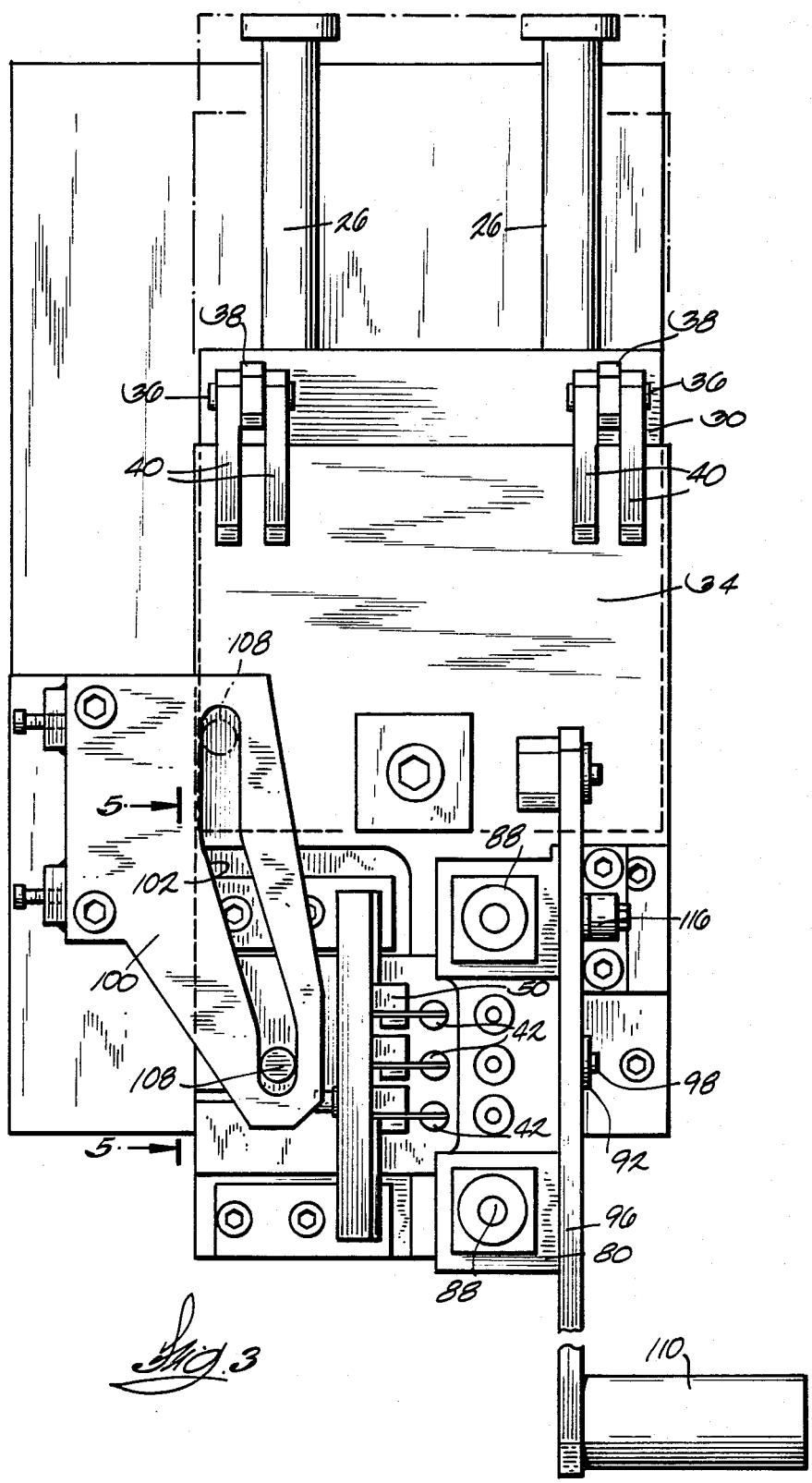
FIG. 3 is a plan view of the machine shown in FIGS. 1 and 2.
Figure 4:
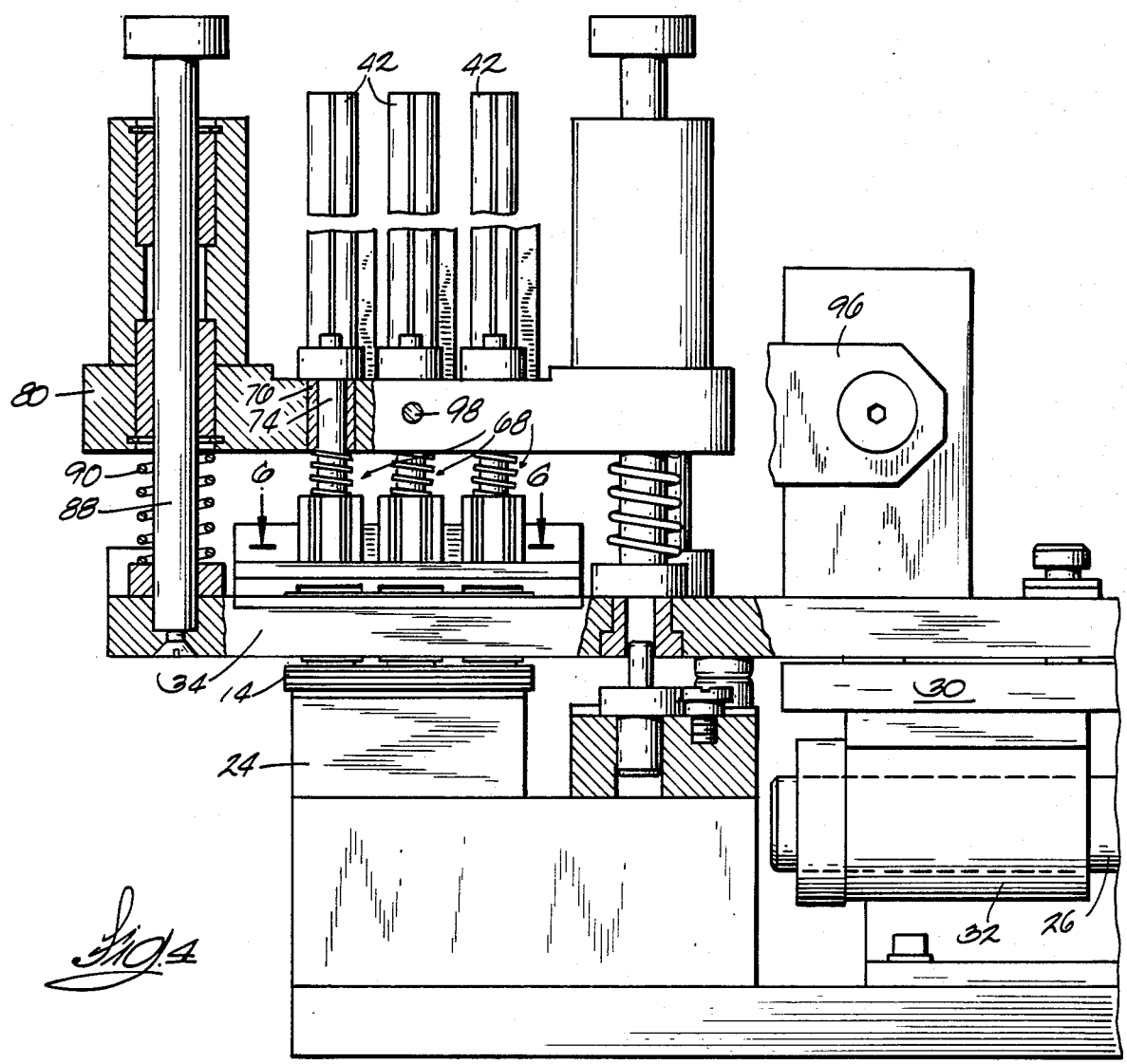
FIG. 4 is a side elevation view of the apparatus illustrated in FIGS. 1 and 2 and with portions broken away in the interest of clarity.
Figure 5:
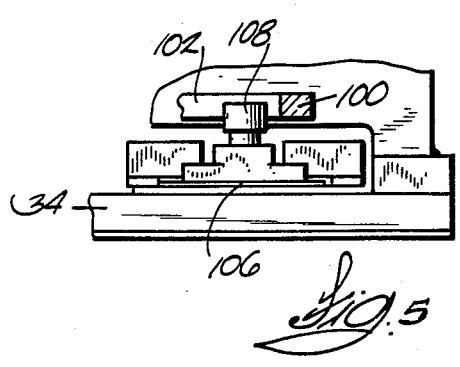
FIG. 5 is a cross section view taken generally along line 5—5 in FIG. 3.
Figure 6:
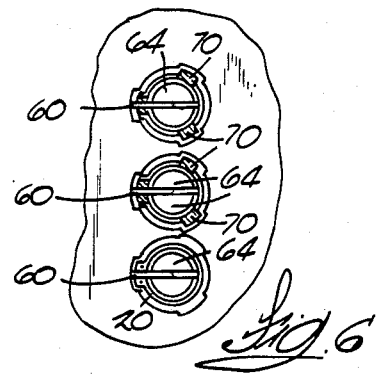
FIG. 6 is a cross section view taken generally along lines 6—6 in FIG. 4.

When the carriage 28 has reached its forward position the handle 110 can then be pulled downwardly. As shown in FIGS. 1 and 2, during forward movement of the carriage 28 the lower surface 112 of the lever 96 rides on a roller 114 supported by the base 22. The rearward portion of the lever 96 includes a notch 116 such that once carriage 28 reaches the forward position, as shown in FIG. 2, the linear surface 112 of the lever 96 clears the roller 114, and the lever 96 may be forced downwardly.

When the forward end of the lever 96 is then forced downwardly, the rams 68 will engage the snap rings positioned over the mandrel 62 and force the snap rings down over the mandrels 62 and onto the upper ends of the hinge pins 16.

The operator then raises the handle 110 and pushes the carriage rearwardly to its rearward position. As the carriage 28 moves rearwardly, the cam 108 and the plate 106 are caused to move laterally to their retracted position. The next successive snap ring 20 will then drop in place for the next cycle of operation described above.

While the machine 10 embodying the invention has been described as being manually operated, in other embodiments of the invention a fluid cylinder could be connected to the forward end of the lever 96 to cause both forward and rearward movement of the carriage as well as to cause vertical reciprocation of the forward end of the lever once the carriage is in its forward position.

One of the substantial advantages of the machine embodying the invention is that the snap rings 20 are held in alignment with one another and are not permitted to become disoriented as they move from the vertical column onto the mandrel and onto the hinge pins.

Additionally, even if the snap rings are non-circular or nonplanar, when they are forced over the mandrel by the rams the snap rings are forced to assume a circular shape and the rams will flatten the snap rings as they force them over the mandrel.

Various features of the invention are set forth in the following claims.

I claim:

1. Apparatus for use in placing a snap ring of the type including a generally circular inner surface and having a central longitudinal axis on a cylindrical pin of the type adapted to support a snap ring, the apparatus comprising:
means for supporting a cylindrical pin,
means for supporting a plurality of snap rings in aligned stacked relation, the stack of snap rings having a longitudinal axis,
means for moving a selected bottom one of the snap rings supported in aligned stacked relation in a direction transverse to the longitudinal axis of the stack of snap rings to a position wherein the selected snap ring is aligned with the cylindrical pin,
means for supporting the selected snap ring such that the longitudinal axis of the selected snap ring is aligned with the longitudinal axis of the cylindrical pin, and
means for forcing the selected snap ring in the direction of the longitudinal axis of the selected snap ring from the means for supporting the snap ring onto the end of the cylindrical pin.

2. The apparatus as set forth in claim 1 wherein said means for focing said snap ring in the direction of its longitudinal axis includes means for causing expansion of the snap ring as it is forced onto the end of the cylindrical pin.

3. Apparatus as set forth in claim 2 wherein said means for causing expansion of the snap ring as the snap ring is forced onto the end of the cylindrical pin includes a mandrel having a longitudinal axis, the mandrel being positioned with its longitudinal axis in alignment with the axis of the cylindrical pin.

4. The apparatus as set forth in claim 3 wherein said mandrel is positioned between said means for supporting the selected snap ring in alignment with the cylindrical pin and the end of the cylindrical pin.

5. The apparatus as set forth in claim 3 wherein said mandrel includes an end positionable closely adjacent the cylindrical pin and wherein said mandrel increases in diameter toward said end of the mandrel adjacent the cylindrical pin.

6. The apparatus as set forth in claim 1 wherein said means for moving a selected bottom one of the snap rings includes a slide member, a cam fixed to said means for supporting the cylindrical pin, and a cam follower, said cam follower being connected to said slide member for causing movement of said slide member in response to movement of said cam follower with respect to said cam.

7. Apparatus for use in forcing a snap ring of the type including a generally circular inner surface and having a central longitudinal axis onto a cylindrical pin of the type adapted to support a snap ring, the apparatus comprising:
a base including means for supporting a cylindrical pin,
a carriage supported by said base for slideable movement with respect to said base, said carriage being moveable forwardly and rearwardly between a rearward position and a forward position, said carriage including means for supporting a plurality of snap rings in aligned stacked relation, the stack of snap rings having a longitudinal axis, means for selectively moving the bottom snap ring of the stack of snap rings in a direction transverse to the longitudinal axis of the stack of snap rings to a position wherein said bottom snap ring is aligned with the cylindrical pin, means for supporting said bottom snap ring in alignment with the cylindrical pin, and means for forcing said bottom snap ring in the direction of its longitudinal axis onto the end of the cylindrical pin.

8. The apparatus as set forth in claim 7 and further including a lever connected to said carriage, said lever including a forward end and being moveable forwardly to cause forward movement of said carriage with respect to said base and said forward end subsequently being moveable downwardly to cause said means for forcing said snap ring onto said cylindrical member to force said snap ring onto said cylindrical member.

9. The apparatus as set forth in claim 7 wherein said means for selectively moving the bottom snap ring of the stack of snap rings to said position wherein said bottom snap ring is aligned with the cylindrical pin includes means for causing movement of said bottom snap ring to the position in alignment with the cylindrical pin when said carriage is moved from said rearward position to said forward position.

10. The apparatus as set forth in claim 9 wherein said means for selectively moving the snap ring includes a slide member slideable in a direction transverse to the direction of movement of said carriage, and adapted to engage said bottom snap ring, a cam supported by said base, said cam including a cam surface, and a cam follower adapted to engage said cam surface, said cam follower being connected to said slide member for causing movement of said slide member in response to movement of said carriage with respect to said base.

11. The apparatus as set forth in claim 7 wherein said means for supporting a plurality of snap rings in aligned stacked relation includes an elongated rod, said elongated rod including a central blade, having opposite faces and opposite ends, one end of said blade being fixed to said carriage, a first semi-cylindrical rod portion fixed to one of said faces of said blade, and a second semi-cylindrical rod portion fixed to the other of said faces of said blade.

12. An apparatus for use in forcing a snap ring onto a cylindrical pin, the apparatus including:

a base including means for supporting a cylindrical pin, a carriage supported by said base for reciprocable movement between a retracted position and a forward position, said carriage including:

means for supporting an elongated stack of snap rings, said elongated stack of snap rings including a longitudinal axis, a mandrel positionable over the cylindrical pin when the carriage is in the forward position, the mandrel being located in laterally spaced relation from the stack of snap rings, means for causing selective lateral movement of said bottom snap ring of the stack of snap rings to a position over said mandrel and for forcing said snap ring onto said mandrel and onto the cylindrical pin.

13. The apparatus as set forth in claim 12 wherein said means for supporting an elongated stack of snap rings includes an elongated blade having opposite ends, one end of said elongated blade being supported by said carriage, and a pair of elongated semi-cylindrical members secured to said blade in opposed facing relation and defining a cylindrical member.

14. The apparatus as set forth in claim 12 wherein said carriage includes a generally horizontal supporting plate, said plate including an aperture, said mandrel being housed in said aperture, said mandrel including a pair of semi-cylindrical members secured together in face-to-face relation, and a blade position between said semi-cylindrical members, said blade being fixed to said supporting plate.

15. The apparatus as set forth in claim 12 wherein said means for causing lateral movement of said bottom snap ring includes a slide member supported for reciprocal movement between a first position and a second position, said slide member being adapted to engaged said snap ring, a cam plate including a cam surface, said cam plate being fixed to said base, and a cam follower engageable with said cam surface, said cam follower being connected to said slide member to cause movement of said slide member in response to movement of said cam follower with respect to said cam surface.

16. The apparatus as set forth in claim 12 wherein said means for forcing said bottom snap ring onto said mandrel and onto the cylindrical pin includes a ram, said ram including a plurality of spaced-apart snap rings, engaging members, and means for causing reciprocal movement of said ram from a first position to a second position wherein the snap ring is forced onto the cylindrical pin.

17. The apparatus as set forth in claim 12 wherein said carriage is supported by said base for slideable movement toward and away from the cylindrical pin between a retracted position and a position wherein said mandrel is positioned above said cylindrical pin, and said means for causing movement of said bottom snap ring including a lever connected to the carriage for causing slideable movement of the carriage toward and away from the cylindrical pin, said lever including a free end moveable downwardly when the carriage is in the forward position for forcing the snap ring onto the cylindrical pin.

18. The apparatus as set forth in claim 12 wherein said means for causing selective lateral movement of said bottom snap ring includes means for causing lateral movement of the snap ring as said carriage moves from said retracted position to said position wherein said mandrel is positioned above said cylindrical pin.

* * * * *